Feb. 19, 1957  G. O. CLEMENTS  2,781,870
EMERGENCY AIR BRAKE ACTUATOR
Filed April 27, 1954  2 Sheets-Sheet 1
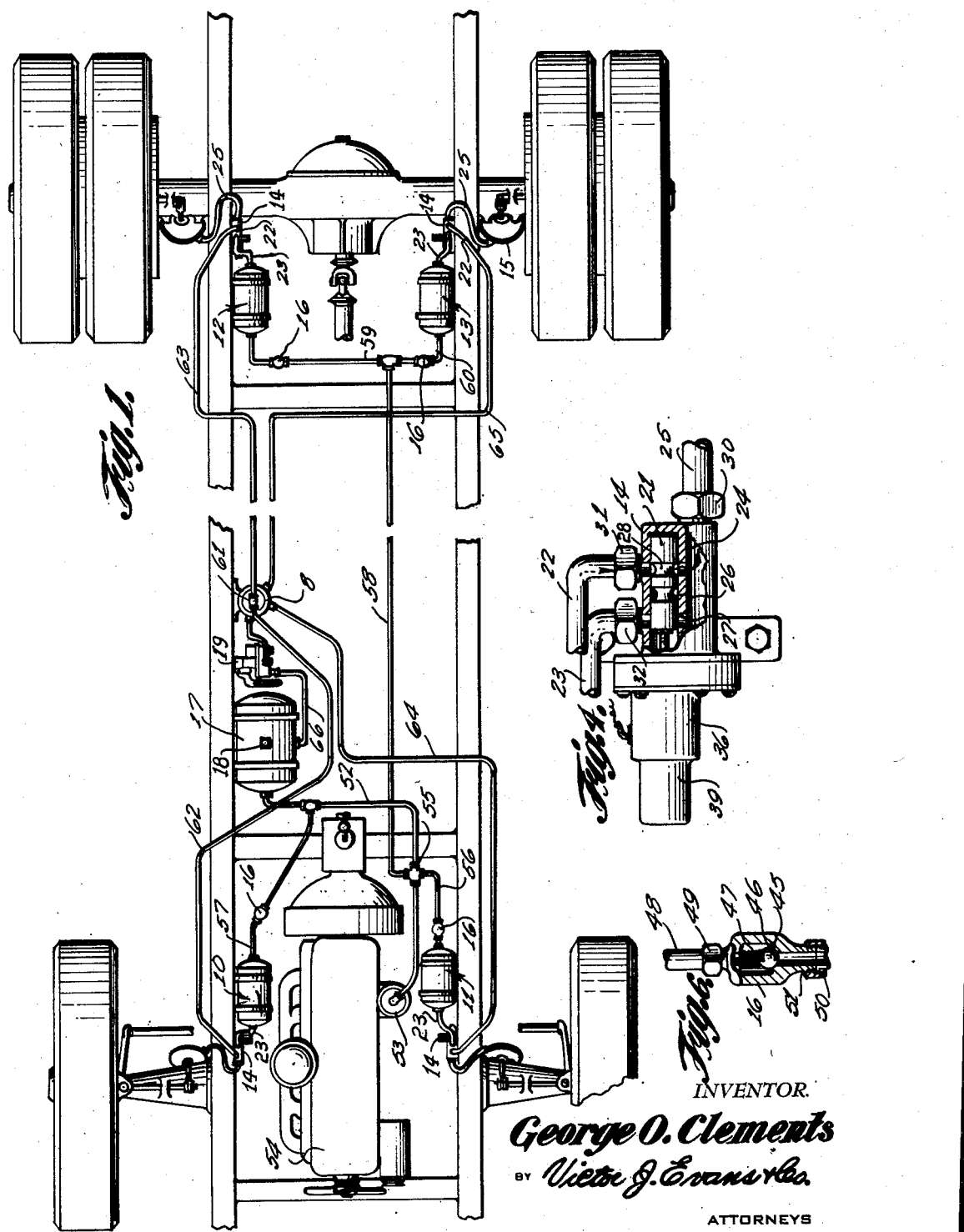
INVENTOR.
*George O. Clements*
BY *Victor J. Evans & Co.*
ATTORNEYS Feb. 19, 1957     G. O. CLEMENTS     2,781,870
EMERGENCY AIR BRAKE ACTUATOR
Filed April 27, 1954     2 Sheets-Sheet 2
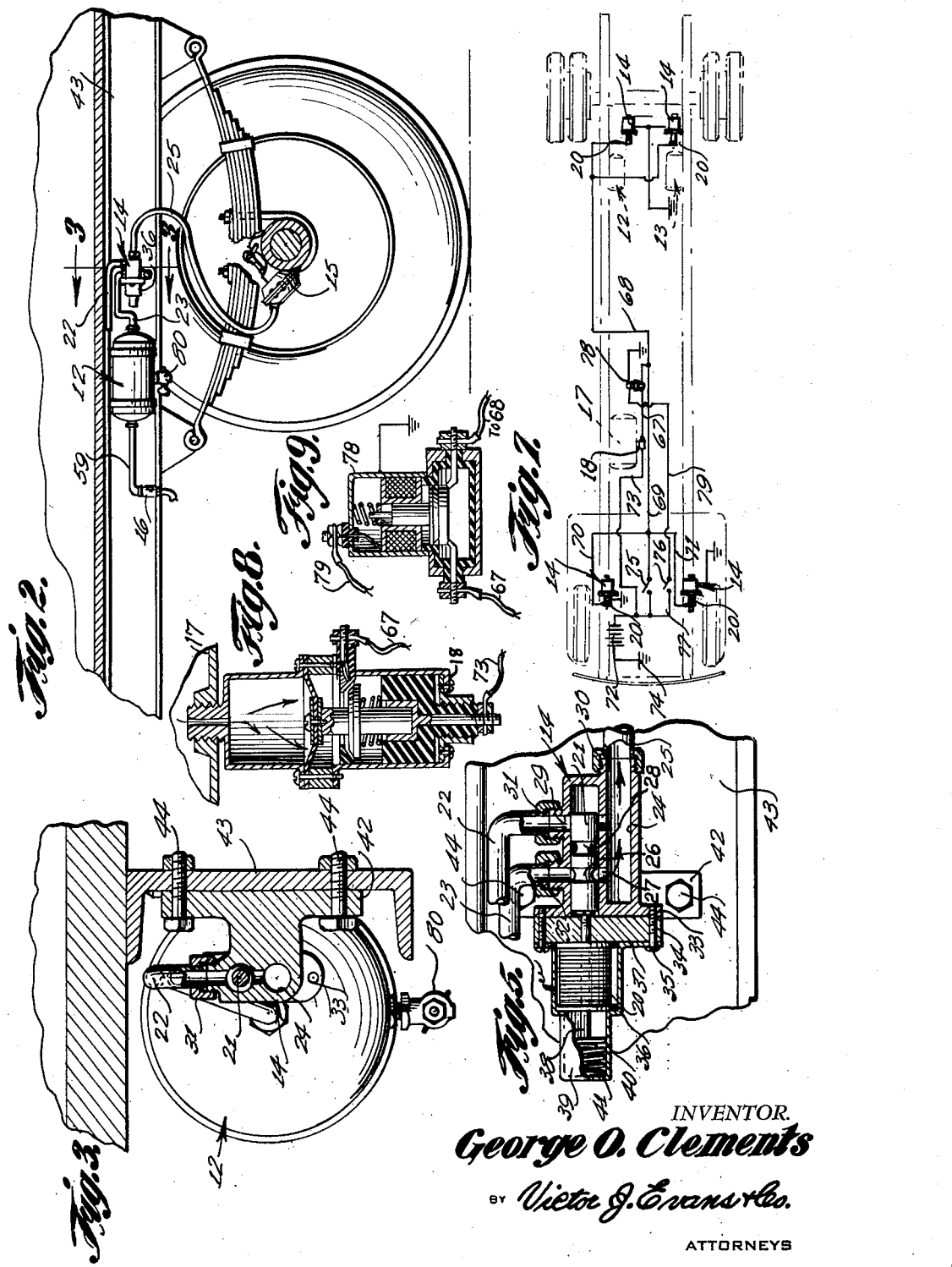
INVENTOR.
*George O. Clements*
BY *Victor J. Evans & Co.*
ATTORNEYS United States Patent Office 2,781,870
Patented Feb. 19, 1957

2,781,870

EMERGENCY AIR BRAKE ACTUATOR

George Oliver Clements, West Long Branch, N. J.

Application April 27, 1954, Serial No. 425,851

6 Claims. (Cl. 188—106)

This invention relates to emergency brake applying devices particularly adapted for trucks, trailers or other vehicles having air brakes, and in particular apparatus for automatically applying brakes when the pressure of the conventional air brake system drops below operating pressure and wherein the pressure of the emergency brake system is manually released, such as by the operator of the vehicle.

The purpose of this invention is to prevent accidents resulting from trucks, trailers and/or other vehicles losing air pressure in brake systems and to provide means whereby emergency additional air pressure may be applied to brakes of conventional brake systems of vehicles.

In numerous instances, due to continuous application of brakes, leaks, damaged connections, and the like, the pressure of fluid in brake systems drops below operating pressure and at critical moments an operator of a vehicle discovers that the brakes are not operating. Without brakes any vehicle, and particularly a heavy trailer truck, bus, or any other vehicle using air brakes, is a hazard and may cause serious damage. With this thought in mind this invention contemplates an emergency brake system in which the brake at each wheel of a vehicle is provided with an auxiliary air reservoir or tank and the tanks are supplied with air from the compressor of the conventional air brake system the operation of which is started by a relay or solenoid actuated switch when pressure in the main air brake system drops substantially five pounds after the warning system of the vehicle has warned the operator the conventional brake system has lost air pressure and that the brakes will be automatically applied below conventional operating pressure.

The object of this invention is, therefore, to provide means for automatically applying brakes of a vehicle when air of a conventional brake system of the vehicle drops below operating pressure.

Another object of the invention is to provide an emergency brake system for vehicles in which a solenoid actuated release switch is provided whereby an operator may manually apply or release the emergency brake system if so desired.

Another object of the invention is to provide an emergency air brake system for vehicles with independent air reservoirs or tanks for each brake in which the system is provided with check valves to prevent the individual tanks losing pressure when the main operating pressure of the system is reduced.

A further object of the invention is to provide an auxiliary air brake system for motor or any vehicles in which the auxiliary system is adapted to be used in combination with or independent of the main or conventional brake system of the vehicle so that an operator of the vehicle may use the auxiliary or emergency system in combination or supplemental to the conventional brake system.

A still further object of the invention is to provide an automatically or manually operating emergency brake system for vehicles in which the auxiliary system is of a simple and economical construction.

With these and other objects and advantages in view the invention embodies an auxiliary or emergency brake system for motor or any vehicles including tanks positioned to operate in combination with each brake of the vehicle, connections having check valves therein connecting the tanks to the main air pressure tank or reservoir of the vehicle, a solenoid actuated switch for releasing pressure in the auxiliary brake system and a solenoid actuated valve through which the emergency or auxiliary brake system is connected to the main air brake system of the vehicle.

Other features and advantages of the invention will appear from the following description taken in connection with the drawings, wherein:

Figure 1 is a plan view showing the chassis of a vehicle illustrating a typical installation wherein auxiliary tanks are connected to brake operating elements of the vehicle and showing the connections of the auxiliary tanks to the main brake system of the vehicle, parts of the chassis being broken away.

Figure 2 is a view showing a longitudinal section through a portion of a vehicle illustrating the position of the auxiliary tank for one wheel of the vehicle with the tank connected through a solenoid actuated valve to the brake of the vehicle.

Figure 3 is a cross section through the installation shown in Fig. 2 being taken on line 3—3 thereof showing the solenoid actuated valve and showing the parts on an enlarged scale.

Figure 4 is a side elevational view of the solenoid actuated valve with parts broken away showing the interior or inner portion of the valve, the parts of which are shown in section.

Figure 5 is a longitudinal section through a solenoid actuated valve showing the valve in the position of applying air from the emergency air tank of a brake to the brake of a vehicle.

Figure 6 is a detail illustrating one of the check valves used in the lines to the auxiliary tanks.

Figure 7 is a view similar to that shown in Fig. 1 illustrating a typical wiring diagram with the parts shown on a reduced scale.

Figure 8 is a longitudinal section through the minimum pressure switch mounted on the reservoir.

Figure 9 is a longitudinal section through the solenoid release switch.

Referring now to the drawings wherein like reference characters denote corresponding parts the improved emergency air brake actuator of this invention includes auxiliary tanks or reservoirs 10, 11, 12 and 13, one of each of which is installed at each wheel or in combination with each brake of the vehicle, solenoid actuated valves, each having a valve body 14 positioned between the tanks and brake operating diaphragm chambers 15, check valves 16 positioned between each of the tanks and connections between the tanks and the conventional air reservoir 17 of the vehicle, a minimum pressure switch 18 which, when the pressure in the main tank 17 has dropped below operating pressure, makes a contact between the current supply and the solenoid of the valves 14 and a brake control valve 19 positioned between the conventional air reservoir of the vehicle and the relay valve 8.

It will be understood that the relay valve 8 may be of any suitable conventional design and may be connected in the system by suitable means. Upon a drop below operating pressure of the conventional air brake system the relay supplies current to solenoids 20 of the valves 14 whereby cores 21 of the valves are actuated from the position shown in Fig. 4 to that shown in Fig. 5 and connections 22 to the main system or tank 17 are closed and connections 23 to the auxiliary tanks 10, 11, 12 and 13 are opened. By this means fluid under pressure in the auxiliary tanks is supplied to the chambers 15 of the brakes of the vehicle.

Each of the solenoid actuated valves 14 is provided with an outlet connection 24 that is provided with a tube 25 that extends to the brake operating chamber 15, as shown in Fig. 2 and the connection 24 is positioned to receive air under pressure from the main reservoir 17 of the vehicle through the connection 22, or from one of the auxiliary tanks through the connection 23. The valve core 21 is provided with an annular recess 26 that is adapted to be positioned to register with an opening 27 that extends through the valve body 14, as shown in Fig. 5 and that is adapted to provide communication between the connection 23 and the chamber 24. The core 21 is also provided with an annular recess 28 that is adapted to register with an opening 29 to establish communication between the connection 22 and the chamber 24. The tube 25 is connected to the chamber or connection 24 with a coupling 30, the connection 22 is connected by a coupling 31 to an inverted nipple on the valve body 14 and the connection 23 is connected by a coupling 32 to a similar threaded nipple on the valve.

A flange 33 at one end of the valve body 14 is connected to a base 34 of the solenoid with screws 35 and the core of the solenoid is positioned in a sleeve 36 that is provided with a flange 37 that extends under the heads of the screws 35 for retaining the parts in assembled relation.

The core 21 of the valve 14 is also provided with a stem 38 that extends into a tube 39 extended from one end of the tube 36, and the stem 38 is provided with a disc 40 that is positioned to bear against the spring 41 in the tubular section 39 of the case whereby upon release of the pressure the spring 41 urges the valve core 21 from the position shown in Fig. 5 to that shown in Fig. 4 wherein the brake system is connected to the conventional reservoir 17.

The valve body 14 is provided with tabs 42 by which the valve may be secured to members of the chassis of the vehicle, as indicated by the numeral 43, with bolts 44 or the like.

Although it is understood that the check valves 16 are conventional and may be provided in suitable designs a check valve is suggested in Fig. 6 in which the body is provided with a seat 45 against which a ball 46 is held with a spring 47 and a connection 48 which is secured to the valve body by a coupling 49 extends to one of the auxiliary tanks within a similar connection 50 connected to the opposite end of the valve body by a coupling 51, 50 extending to the main supply tank or reservoir 17.

As illustrated in Fig. 1 a connection 52 extends from the reservoir 17 to a compressor 53 adapted to be actuated by an engine 54 of a vehicle and, in the design shown the connection 52 is provided with a fitting, such as a cross 55 that is connected to the reservoir 11 by a tube 56. One of the check valves 16 is provided in the tube 56, as shown.

The auxiliary tank 10 is also connected to the connection 52 by a tube, such as the tube 57 and one of the check valves 16 is provided in the tube 57. The fitting 55 is also connected by a tube 58 to the tanks 12 and 13 via branch tubes 59 and 60 and check valves 16 are provided in the tubes 59 and 60.

The tanks 10, 11, 12 and 13 are connected to the valves 14 by the connections 23 and the main line connections 22 from the valves 14 extend to the conventional control valve 19 with a fitting 61 on the valve connected to the tank 10 with a tube 62, the valve associated by the tank 12 connected to the fitting 61 by a tube 63, the valve associated with the tank 11 connected to the valve by a tube 64 and the valve of the tank 13 connected to the valve by a tube 65. The relay valve 8 is connected to the reservoir 17 by a tube 66 in which a conventional release valve 78 is positioned.

With the parts assembled and installed as shown and described a drop in the pressure of the air brake system of the vehicle actuates the relay 18 which, as shown in Fig. 7 supplies current through the wire 67 to a wire 68 which is connected to terminals of the solenoids 20 of the valve 14 of the tanks 12 and 13 and by wire 69 to wires 70 and 71 which energize the solenoids 20 of the valves of the tanks 10 and 11, the opposite terminals of the solenoids being grounded and the opposite terminals of the relay 18 being connected to ignition or suitable battery 72 by a wire 73. The opposite terminal of the battery 72 is grounded as shown at the point 74.

The system is also provided with a manually actuated switch 75 that connects the battery directly to the wire 69 whereby current is supplied to the solenoids of the valves 14 through the wires 68, 70 and 71. By this means an operator of a vehicle may readily apply the brakes by using the auxiliary cylinders or tanks with the switch 75, which may be positioned in the cab of a truck, bus or vehicle on the instrument panel of a vehicle.

The system is also provided with a pressure release switch 76 that is connected to the battery by a wire 77 and which is connected to the solenoid release switch 78 by a wire 79 whereby, after setting the brakes of the vehicle with the auxiliary brake system the operator may release the brakes by the switch 76 if he desires to move the vehicle.

With this improved emergency air brake actuator the brakes of any vehicle using air brakes, and particularly a trailer truck or bus, are automatically applied when air in the conventional air brake system of the vehicle drops below a predetermined pressure, the low pressure actuating the relay to energize the solenoids of the valves 14 whereby air pressure in the auxiliary tanks 10, 11, 12 and 13 is instantly applied to the brake operating chambers 15 to apply the brakes.

With the switch 75 the operator of the vehicle may also complete circuits to the solenoids of the valves 14 to use the air pressure in the auxiliary cylinders to supplement the conventional system, so that the auxiliary brake system may be automatically or manually actuated as may be desired.

The system illustrated particularly in Figures 1 and 7 includes a complete unit for a truck, tractor, or other vehicle and these units may be duplicated on additional vehicles with the vehicles used in a train or in tandem, such as a trailer mounted on a tractor and the units may be operated independently or connected to the fittings or valves of the pressure lines of the system shown particularly in Figure 1. Conventional hose connections and couplings may be used to connect the system of one vehicle to the system of a following vehicle.

Furthermore should the operator of the vehicle decide to move the vehicle the pressure of the auxiliary brake system may readily be released with the switch 76 supplying current to the solenoid release switch 78 which permits the springs 41 to return the cores of the valves 14 to the position shown in Fig. 4 whereby the brake chambers are in communication with the conventional air brake system of the vehicle.

It will be understood that the elements of the automatic emergency air brake actuator may be assembled in different arrangements or combinations, for different types of vehicles and the connections, tubes, and other parts of the apparatus may be connected to suitable parts of the vehicle. It is desired to locate the auxiliary tanks and also the valves 14 substantially close to the brakes and with the parts as shown the auxiliary tanks are cut off from the system by the check valves 16 and each tank is provided with a drain cock or valve, as indicated by the numerals 80.

It will be understood that modifications, within the scope of the appended claims, may be made in the design and arrangement of the parts without departing from the spirit of the invention.

What is claimed is:

1. An emergency brake system for use on a vehicle having wheel brakes comprising an auxiliary tank positioned adjacent each wheel brake of the vehicle, means connecting the auxiliary tanks to a tank of a conventional air brake system of the vehicle, means preventing the return of fluid from the auxiliary tanks to said tank of the vehicle, a solenoid actuated valve, and means controlled by the solenoid actuated valve for applying fluid from the auxiliary tanks to brake actuating elements of the vehicle upon drop in pressure of fluid of the conventional brake system of the vehicle.

2. An emergency brake system for use on a vehicle comprising an auxiliary tank positioned adjacent each wheel brake of the vehicle, means for connecting the auxiliary tanks to a tank of a conventional air brake system of the vehicle, check valves in the connections to each auxiliary tank preventing return of fluid from the auxiliary tanks to the tank of the conventional brake system, and means actuated by a drop in pressure to a predetermined amount of fluid in the conventional brake system of the vehicle whereby fluid is applied from the auxiliary tanks to brake operating elements of the vehicle.

3. An emergency brake system for use on a vehicle comprising an auxiliary tank positioned adjacent each wheel brake of the vehicle, means for connecting the auxiliary tanks to a reservoir of a conventional air brake system of the vehicle, check valves in the connections from the auxiliary tanks to the reservoir preventing flow of fluid from the tanks to the reservoir, solenoid actuated valves connected to the reservoir, said valves being positioned in connections from the reservoir of the conventional brake system of the vehicle to brakes of the vehicle and positioned whereby pressure may be applied, selectively, from the reservoir of the conventional brake system of the vehicle or from the emergency tanks to brake operating elements of the vehicle, and means for actuating the solenoid actuated valves when pressure of the conventional brake system of the vehicle drops below a predetermined amount.

4. An emergency brake system for use on a vehicle comprising an auxiliary tank positioned adjacent each wheel brake of the vehicle, means for connecting the auxiliary tanks to a reservoir of a conventional air brake system of the vehicle, check valves in the connections from the auxiliary tanks to the reservoir preventing flow of fluid from the tanks to the reservoir, solenoid actuated valves connected to the reservoir, said valves being positioned in connections from the reservoir of the conventional brake system of the vehicle to brakes of the vehicle and positioned whereby pressure may be applied, selectively, from the reservoir of the conventional brake system of the vehicle or from the emergency tanks to brake operating elements of the vehicle, means for actuating the solenoid actuated valves when the pressure of the conventional brake system of the vehicle drops below a predetermined amount, and means for actuating said valves from a cab or instrument panel.

5. In an emergency brake device for use on a vehicle, the combination which comprises an auxiliary tank for each brake of the vehicle, tubes for connecting the auxiliary tanks to the reservoir of a conventional brake system of the vehicle, check valves in the means for connecting the auxiliary tanks to the reservoir to prevent flow of fluid from the tanks to the reservoir, solenoid actuated valves connected to the tanks and positioned in connections between the reservoir of the brake system of the vehicle and brake actuating elements of the vehicle, said solenoid actuated valves providing passage for flow of fluid from the reservoir to brake elements of the vehicle, means for actuating said valves to close the connections from the reservoir to the tanks, operating elements for opening the connections from the tanks to the brake actuating elements, manually actuated means for establishing communication between the tanks and brake elements of the vehicle, and a solenoid actuated switch for actuating the valves to apply pressure of the tanks to the brake elements of the vehicle.

6. In an emergency air brake actuator, the combination which comprises an auxiliary air pressure tank for each wheel brake of a vehicle, solenoid actuated valves connected to said tanks, tubes adapted to connect the solenoid actuated valves to brake elements of a brake system of the vehicle, a relay actuated valve, tubes connecting the relay actuated valve to the solenoid actuated valves of the tanks, tubes adapted to connect the relay actuated valve to the reservoir of the conventional brake system of the vehicle, a manually actuated solenoid operated relief valve for releasing pressure to the brakes of the vehicle, and a manually actuated control switch for applying fluid from the tanks to the brake elements for applying the brakes.

References Cited in the file of this patent

UNITED STATES PATENTS

| | | |
|---|---|---|
| 1,008,102 | Allen | Nov. 7, 1911 |
| 2,116,882 | Dickey | May 10, 1938 |
| 2,502,152 | Hudson | Mar. 28, 1950 |
| 2,649,169 | Holman | Aug. 18, 1953 |
| 2,680,500 | Jenkins | June 8, 1954 |
| 2,726,738 | Fawick | Dec. 13, 1955 |